(12) United States Patent
Wright et al.

(10) Patent No.: US 9,745,899 B2
(45) Date of Patent: Aug. 29, 2017

(54) ENHANCING POWER CYCLE EFFICIENCY FOR A SUPERCRITICAL BRAYTON CYCLE POWER SYSTEM USING TUNABLE SUPERCRITICAL GAS MIXTURES

(75) Inventors: Steven A. Wright, Albuquerque, NM (US); Paul S. Pickard, Albuquerque, NM (US); Milton E. Vernon, Albuquerque, NM (US); Ross F. Radel, Madison, WI (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 364 days.

(21) Appl. No.: 13/204,150

(22) Filed: Aug. 5, 2011

(65) Prior Publication Data
US 2013/0033044 A1 Feb. 7, 2013

(51) Int. Cl.
*F01K 7/32* (2006.01)
*F01K 25/10* (2006.01)
(Continued)

(52) U.S. Cl.
CPC .................. *F02C 9/00* (2013.01); *F01K 7/32* (2013.01); *F01K 25/08* (2013.01); *F01K 25/103* (2013.01);
(Continued)

(58) Field of Classification Search
CPC ......... Y02E 10/46; F01K 7/32; F01K 25/103; F01K 25/08; F02C 1/10; F22B 29/026; F22B 35/086; F22B 3/08
(Continued)

(56) References Cited

U.S. PATENT DOCUMENTS 3,877,218 A * 4/1975 Nebgen ............................ 60/775
5,131,231 A * 7/1992 Trimble et al. ................ 60/649
(Continued)

FOREIGN PATENT DOCUMENTS

EP 1930587 A2 6/2008
JP 2011-0256818 A 12/2011
(Continued)

OTHER PUBLICATIONS

Wright, Steven. Supercritical Brayton Cycle Nuclear Power System Concepts. 2007. AIP Conference Proceedings.*
(Continued)

*Primary Examiner* — Mark Laurenzi
*Assistant Examiner* — Wesley Harris
(74) *Attorney, Agent, or Firm* — Daniel J. Jenkins (57) ABSTRACT

Various technologies pertaining to tuning composition of a fluid mixture in a supercritical Brayton cycle power generation system are described herein. Compounds, such as Alkanes, are selectively added or removed from an operating fluid of the supercritical Brayton cycle power generation system to cause the critical temperature of the fluid to move up or down, depending upon environmental conditions. As efficiency of the supercritical Brayton cycle power generation system is substantially optimized when heat is rejected near the critical temperature of the fluid, dynamically modifying the critical temperature of the fluid based upon sensed environmental conditions improves efficiency of such a system.

19 Claims, 6 Drawing Sheets

(51) Int. Cl.
*F01K 25/08* (2006.01)
*F02C 1/10* (2006.01)
*F22B 29/02* (2006.01)
*F22B 35/08* (2006.01)
*F22B 3/08* (2006.01)
*F02C 9/00* (2006.01)

(52) U.S. Cl.
CPC .................. *F02C 1/10* (2013.01); *F22B 3/08* (2013.01); *F22B 29/026* (2013.01); *F22B 35/086* (2013.01); *Y02E 10/46* (2013.01)

(58) Field of Classification Search
USPC .................................................... 60/645–681
See application file for complete search history.

(56) References Cited

U.S. PATENT DOCUMENTS

| | | | | |
|---|---|---|---|---|
| 5,431,016 | A * | 7/1995 | Simpkin | 60/650 |
| 6,308,531 | B1 * | 10/2001 | Roberts et al. | 62/611 |
| 6,526,757 | B2 * | 3/2003 | Mackay | 60/773 |
| 6,644,062 | B1 * | 11/2003 | Hays | 62/402 |
| 6,674,830 | B2 * | 1/2004 | Kato et al. | 376/391 |
| 6,813,895 | B2 * | 11/2004 | Eisenhower et al. | 62/115 |
| 6,824,710 | B2 * | 11/2004 | Viteri et al. | 252/373 |
| 6,848,258 | B1 * | 2/2005 | Speece | 60/649 |
| 6,910,335 | B2 | 6/2005 | Viteri et al. | |
| 7,436,922 | B2 * | 10/2008 | Peter | 376/383 |
| 7,645,437 | B1 * | 1/2010 | Moore et al. | 423/539 |
| 7,874,162 | B2 | 1/2011 | Tomlinson et al. | |
| 7,926,276 | B1 * | 4/2011 | Dunn | 60/682 |
| 2005/0126156 | A1 * | 6/2005 | Anderson et al. | 60/39.12 |
| 2005/0236602 | A1 * | 10/2005 | Viteri et al. | 252/372 |
| 2007/0256424 | A1 | 11/2007 | Briesch et al. | |
| 2008/0141673 | A1 * | 6/2008 | Lehar et al. | 60/651 |
| 2009/0308072 | A1 * | 12/2009 | Kay | 60/641.8 |
| 2010/0058755 | A1 * | 3/2010 | Carter | 60/515 |
| 2010/0107634 | A1 * | 5/2010 | Xu et al. | 60/651 |
| 2010/0154381 | A1 | 6/2010 | Rapp et al. | |
| 2010/0156112 | A1 * | 6/2010 | Held et al. | 290/1 A |
| 2010/0287934 | A1 * | 11/2010 | Glynn et al. | 60/645 |
| 2013/0033037 | A1 * | 2/2013 | Held et al. | 290/2 |

FOREIGN PATENT DOCUMENTS

| | | |
|---|---|---|
| KR | 10-1138223 B1 | 4/2012 |
| WO | WO95/22690 A2 | 8/1995 |

OTHER PUBLICATIONS

Oh, et al., "Development of a Supercritical Carbon Dioxide Brayton Cycle: Improving PBR Efficiency and Testing Material Compatibility". Retrieved at <<http://www.inl.gov/technicalpublications/Documents/2906955.pdf>>, Idaho National Engineering and Environmental Laboratory, Idaho Falls, Idaho 83415. Oct. 2004. pp. 1-38.

"Supercritical Carbon Dioxide Brayton Cycle Turbines Promise Giant Leap". Retrieved at <<http://www.energy-daily.com/reports/Supercritical_Carbon_Dioxide_Brayton_Cycle_Turbines_Promise_Giant_Leap_999.html>>, Energy Daily. Mar. 11, 2011, pp. 1-3.

"Supercritical carbon dioxide". Retrieved at <<http://en.wikipedia.org/w/index.php?title=Special:Book&bookcmd=download&collection_id=3591fdd97f21b185&writer=rl&return_to=Supercritical+carbon+dioxide>>, Retrieval Date: Jul. 7, 2011. pp. 1-4.

* cited by examiner

ENHANCING POWER CYCLE EFFICIENCY FOR A SUPERCRITICAL BRAYTON CYCLE POWER SYSTEM USING TUNABLE SUPERCRITICAL GAS MIXTURES

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Due to environmental concerns as well as increasing population, environmentally friendly and efficient power generation systems are desired. While there have recently been advances in systems that utilize renewable resources, such as solar power, wind, geothermal energy, and the like, efficiencies of such systems trail conventional turbine-based power generation systems, and costs of building such systems are relatively high. Moreover, generally, systems that utilize renewable resources output variable amounts of electrical power (e.g., depending upon cloud cover, wind speeds, . . . ).

Supercritical Brayton cycle power generation systems have been proposed and theorized as efficient power generation systems. Advantages of supercritical Brayton cycle power generation systems include the utilization of an environmentally friendly, naturally occurring compound such as carbon dioxide. Additional advantages of supercritical Brayton cycle power generation systems include a relatively small footprint when compared to conventional turbine-based power generation systems. Moreover, supercritical Brayton cycle power generation systems have been theorized to have efficiencies that meet or exceed efficiencies of conventional power generation systems.

Supercritical Brayton cycle power generation systems offer a promising approach to achieving higher efficiency and more cost-effective power conversion when compared to existing steam-driven power plants, and also perhaps gas turbine power plants. A supercritical Brayton cycle power generation system is a power conversion system that utilizes a single-phase fluid operating near the critical temperature and pressure of such fluid. Generally, two types of power conversion cycles have been proposed: a recuperated Brayton cycle and a recompression Brayton cycle. Other types of power cycles, such as a power take off cycle, cycles with reheat or inter-cooling, split-flow compressor discharge cycles that heat a fraction flow rather than recuperate it, or cycles that feed all or a portion of the high pressure flow directly to a turbine while the low pressure flow leg provides the heating can also be utilized, wherein such cycles employ a Brayton cycle.

SUMMARY

The following is a brief summary of subject matter that is described in greater detail herein. This summary is not intended to be limiting as to the scope of the claims.

In general, various technologies pertaining to supercritical Brayton cycle power generation systems are described herein. A supercritical Brayton cycle power generation system includes a generator and a turbine that is configured to drive the generator by way of a shaft that couples the turbine to the generator. When operating at design temperatures/pressures, a compressor is configured to compress supercritical fluid and transmit such compressed fluid to a heater. The heater is operable to heat the fluid, which causes the fluid to expand towards the turbine, which in turn causes the turbine to rotate the shaft and generate electric power at the generator.

To substantially optimize efficiency of the supercritical Brayton cycle power generation system, such system desirably rejects heat at or near the critical temperature of the supercritical fluid that is flowing through the system. Accordingly, described herein are supercritical Brayton cycle power generation systems that use mixtures of supercritical fluids that can be "tuned" to operate at either higher or lower heat rejection temperatures to increase cycle efficiency. Therefore, such a power generation system can be "tuned" to operate at high efficiency based on local environmental or seasonal changes. In another exemplary embodiment, a supercritical Brayton cycle power generation system can even operate dry (without water cooling) by changing the gas mixture and without changing the hardware. Accordingly, as described herein, composition of fluid can be selected to cause the fluid to have a critical temperature that enhances efficiency of the supercritical Brayton cycle power generation system relative to sensed environmental conditions.

Other aspects will be appreciated upon reading and understanding the attached figures and description.

DETAILED DESCRIPTION

Various technologies pertaining to supercritical Brayton cycle power generation systems will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the term "component" is intended to encompass computer-readable data storage that is configured with computer-executable-instructions that cause certain functionality to be performed when executed by a processor. The computer-executable instructions may include a routine, a function, or the like. It is also to be understood that a component may be localized on a single device or distributed across several devices.

Figure 1:
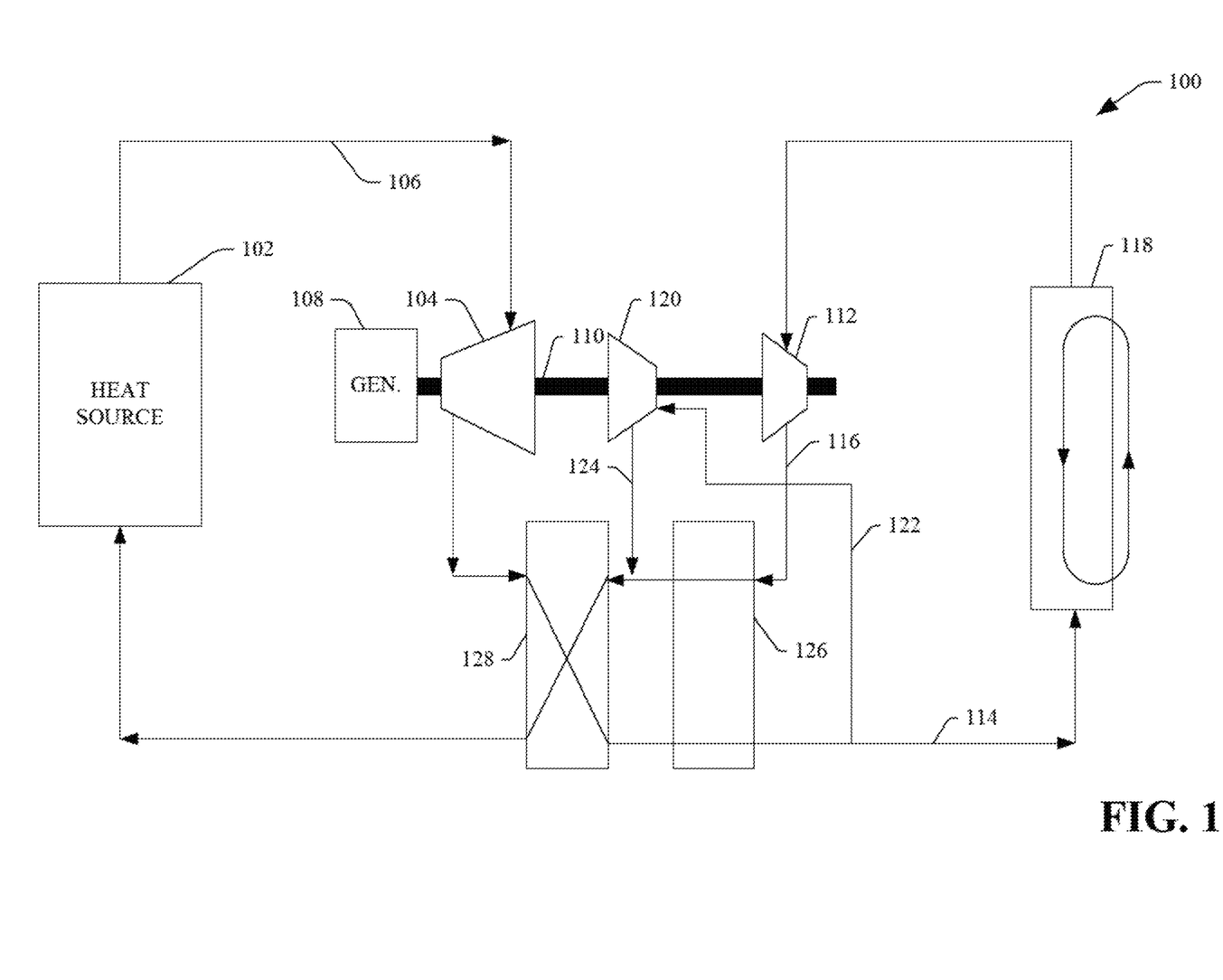
FIG. 1 is a schematic diagram of an exemplary supercritical Brayton cycle power generation system.

With reference now to FIG. 1, a schematic diagram of an exemplary supercritical Brayton cycle power generation system 100 is illustrated. Supercritical Brayton cycle power generation systems, generally, offer a promising approach to achieving higher efficiency and more cost effective power conversion than existing steam driven power plants. In an example, a supercritical $CO_2$ power cycle ($SCO_2$) can be leveraged in a supercritical Brayton cycle power generation system to achieve relatively high efficiencies across a range of heat source temperatures that may be provided by nuclear, fossil, solar, or geothermal heat sources. Furthermore, a supercritical Brayton cycle power generation system will have high power density and be very compact relative to existing steam systems.

A supercritical Brayton cycle power generation system is a power conversion system that uses a single-phase fluid operating near the critical temperature and pressure of the fluid. Heat rejection in a supercritical Brayton cycle power generation system generally occurs when fluid conditions are near the critical temperature and pressure of the fluid. In general, the highest cycle efficiencies occur when the temperature of the fluid at an inlet of a primary compressor of such a generation system is very near the critical temperature and pressure of the fluid.

The supercritical Brayton cycle power generation system 100 comprises a heat source 102 that includes an inlet port and an outlet port (not shown). The heat source 102 may be any suitable heat source, including but not limited to a fossil fuel heat source, a nuclear heat source, a geothermal heat source, or the like. The heat source 102 is configured to provide thermal energy (heat) to a single-phase fluid that flows through the system 100. In an exemplary embodiment, the fluid in the supercritical Brayton cycle power generation system 100 may include $CO_2$. With more particularity, the fluid in the supercritical Brayton cycle power generation system 100 may be a mixture of $CO_2$ and at least one other additive, which may be an Alkane, Neon, Nitrogen, Helium, etc. The mixture can be selected to cause the critical temperature of the fluid to be at a desired temperature, which can be selected based at least in part upon a sensed environmental condition pertaining to the supercritical Brayton cycle power generation system 100. The sensed environmental condition may be ambient temperature surrounding the system 100, day/night cycle data (temperature range) corresponding to the system 100, seasonal temperatures corresponding to the system 100, humidity proximate to the system 100, barometric pressure in the environment of the system 100, etc.

The system 100 further comprises a turbine 104, wherein the turbine 104 includes an inlet port and an outlet port (not shown). First piping 106 couples the heat source 102 to the inlet port of the turbine 104, such that the fluid, expanding due to the thermal energy provided by the heat source 102, drives the turbine 104. Pursuant to an example, the piping in the system 100 may be composed of any suitable material that can transport fluid at relatively high temperatures, including stainless steel, cast iron, or the like. The fluid in the first piping 106 is at relatively high temperature and pressure, which causes the turbine 104 to rotate relatively rapidly.

The fluid exiting the turbine 104 at the outlet port remains at a high temperature but has a lower pressure than the fluid received at the inlet of the turbine 104. The system 100 further comprises an alternator 108 that is coupled to the turbine 104 by way of a shaft 110. Rotation of the shaft 110 causes the alternator 108 to generate electric power.

The supercritical Brayton cycle power generation system 100 further comprises a main compressor 112, which receives the fluid at an inlet port (not shown) (after heat from the fluid has been rejected) and compresses such fluid. Second piping 114 is configured to couple the outlet port of the turbine 104 with the inlet port of the main compressor 112, such that the fluid is directed from the turbine 104 to the main compressor 112. The compressed, cooled fluid exits the main compressor 112 by way of an outlet port (not shown). Third piping 116 couples the outlet port of the main compressor 112 with the inlet port of the heat source 102, such that the fluid is directed from the main compressor 112 to the heat source 102.

The system 100 additionally comprises a heat rejector 118 that rejects heat near the critical temperature of the fluid. In an example, "near the critical temperature of the fluid" can be within 1% of the critical temperature of the fluid, within 5% of the critical temperature of the fluid, or within 10% of the critical temperature of the fluid. In another example, "near the critical temperature of the fluid" can be within one degree K of the critical temperature of the fluid, within 5 degrees K of the critical temperature of the fluid, or within 10 degrees K of the critical temperature of the fluid. The heat rejector 118 may be any suitable heat rejector, such as a liquid-cooling system, a dry cooling system, or the like.

The supercritical Brayton cycle power generation system 100 may optionally include a recompressor 120, which receives fluid (still at relatively high temperatures) that has been output by the turbine 104. Fourth piping 122 couples the second piping 114 with an inlet port of the recompressor 120, which recompresses such fluid. Fifth piping 124 couples an outlet port of the recompressor 120 with the third piping 116 (which includes fluid compressed by the main compressor 112). The fluid then travels by way of the third piping 116 to the inlet port of the heat source 102.

The system 100 also includes a low temperature recuperator 126 and a high temperature recuperator 128. The low temperature recuperator 126 is configured to exchange heat between the fluid in the third piping 116 and the fluid in the second piping 114. In other words, the low temperature recuperator 126 is configured to transfer heat from the fluid in the second piping 114 to the fluid output by the main compressor 112 in the third piping 116, thereby increasing the temperature of the fluid in the third piping 116. The high temperature recuperator 128 transfers heat from fluid directly output by the turbine 104 with the fluid output by the combination of the main compressor 112 and the recompressor 120 (in the third piping 116). Again, this causes the temperature of the fluid in the third piping 116 to be further increased prior to being received at the heat source 102, thereby reducing an amount of energy utilized by the heat source 102 to cause the temperature of the fluid to be suitable for provision to the turbine 104.

Efficiency of the system 100 can be relatively high compared to other power generation systems, which is based at least in part upon the low amount of work required of the main compressor 112 due to the high density of the supercritical fluid near its critical temperature. Further, heat rejection is also nearly isothermal near the critical point, which also further increases efficiency. The re-compression cycle may be desirably employed, as such cycle can account for the pressure dependence of heat capacity, and thus permits the temperature rise in the high pressure leg of the recuperators (in the third piping 116) to equal the temperature drop in the low pressure leg (the second piping 114).

This allows the cycle to have very large amounts of recuperation which causes the heat addition to be more isothermal and further increases efficiency. The re-compression cycles also avoids a "pinch" point in the cold side of the recuperators, because the higher heat capacity of the high pressure supercritical fluid reduces the magnitude of the temperature rise along the length of the recuperator. A "pinch" in the recuperator results in no temperature difference between the hot and cold legs of the recuperator over some region of the recuperator. When this happens, no heat transfer occurs, making the recuperator ineffective in transferring heat.

As described above, the mixture of the fluid utilized in the supercritical Brayton cycle power generation system 100 may include $CO_2$, as the critical temperature of $CO_2$ is near 305 K (88 F), which is a good temperature for heat rejection over most of the planet. The critical pressure is near 1070 psia. At this pressure the fluid density is very high (approximately 60% the density of water) at the inlet port of the main compressor 112. The fluid density at the inlet port of the turbine 104 is near 20% the density of water, and near 10% the density of water at the outlet port of the turbine 104. Thus, in essence, the supercritical Brayton cycle power generation system 100 operates at very high fluid densities (water-like densities), which makes the power generation system very compact. The power system is simple because the fluid is single phase. Additionally, $CO_2$ is inexpensive and is compatible with stainless steels and nickel alloys up to 650-750 C. It is to be understood that other chemical elements or compounds may be the primary compound in the system 100; however, because each fluid has its own unique critical temperature and pressure the heat rejection system must be capable of operating at this temperature. For example, Hexane has a critical temperature near 500 K, ideally meaning that the heat rejection temperature of the cycle would be near 500 K, which is an ideal fluid for operating with dry cooling (no water is used in the ultimate heat rejection process).

As described above, efficiency of the system 100 improves as the temperature that heat is rejected by the heat rejector 118 approaches the critical temperature of the operating fluid of the system. In some environments (e.g., based on ambient temperatures surrounding the system 100), the critical temperature of $CO_2$ may be higher or lower than optimal. For instance, in a cooler climate it may be desirable for heat rejection to occur at temperatures lower than the critical temperature of $CO_2$. Accordingly, mixtures of $CO_2$ and other fluids can be used to adjust the effective critical temperature of the fluid either higher or lower, depending on environmental conditions. The adjustment of the composition of the fluid can be undertaken dynamically, such that the system 100 operates at peak efficiencies as ambient temperature alters (e.g., from day to night, from season to season). A suitable refrigerant can be mixed with $CO_2$ to cause the effective temperature of the fluid to be lower than that of $CO_2$. In an example, the refrigerant may be an Alkane, such as Hexane, Methane, Butane, Propane, Ethane, Isobutane, Pentane, or the like. In another example, the refrigerant may be an element such as Neon or Helium. Pursuant to an example, the mixture may include less than 15% refrigerant by molar concentration but more than 10% refrigerant by molar concentration. In another example, the mixture may include less than 10% refrigerant by molar concentration but more than 5% refrigerant by molar concentration. In still yet another example, the mixture may include less than 5% refrigerant by molar concentration. Alternatively, an element or compound can be added to $CO_2$ to raise the critical temperature of the mixture above that of pure $CO_2$. This modification of the critical temperature of the fluid allows the heat rejector 118 to reject heat at lower or higher temperatures depending upon weather conditions. For instance, the heat rejector 118 can reject heat at lower temperatures during winter or at night when the environmental conditions can allow for more cooling. Furthermore, for mixtures that include no chlorine or fluorine in the additive, such as Alkanes, the mixture includes non-acidic forming compounds in the presence of impurities such as water. In this case, legacy supercritical systems can be used provided proper design allowances were included in the original design.

Selection of compounds to include in the fluid mixture can depend upon a number of conditions, including compatibility of the fluid mixture with other materials that may be exposed to the fluid. For power generation systems such as the system 100, these materials can include non-metallic materials used for electrical wiring insulators, seals, O-rings, and valves. The composition of the fluid mixture can also take into account the ability of the fluid to not decompose upon heating or form corrosive compounds with trace contaminants of water, oxygen, and other impurities within the system 100, such as when the Alkanes are used as the additive mixtures.

In operation, the supercritical Brayton cycle power generation system 100 may be employed in a variety of settings. For instance, the supercritical Brayton cycle power generation system 100 may be utilized in a power plant. Additionally or alternatively, the supercritical Brayton cycle power generation system 100 may be employed as a heat transfer system for both heating and refrigeration to temperatures well below the temperature of freezing point of water. Therefore, for example, the supercritical Brayton cycle power generation system 100 may be utilized to provide electric power to residences, to an enterprise, or the like. Furthermore, the supercritical Brayton cycle power generation system 100 may be employed to provide electric power to one or more mobile vehicles such as a ship, an aircraft carrier, a submarine, a large airplane, or the like.

Figure 2:
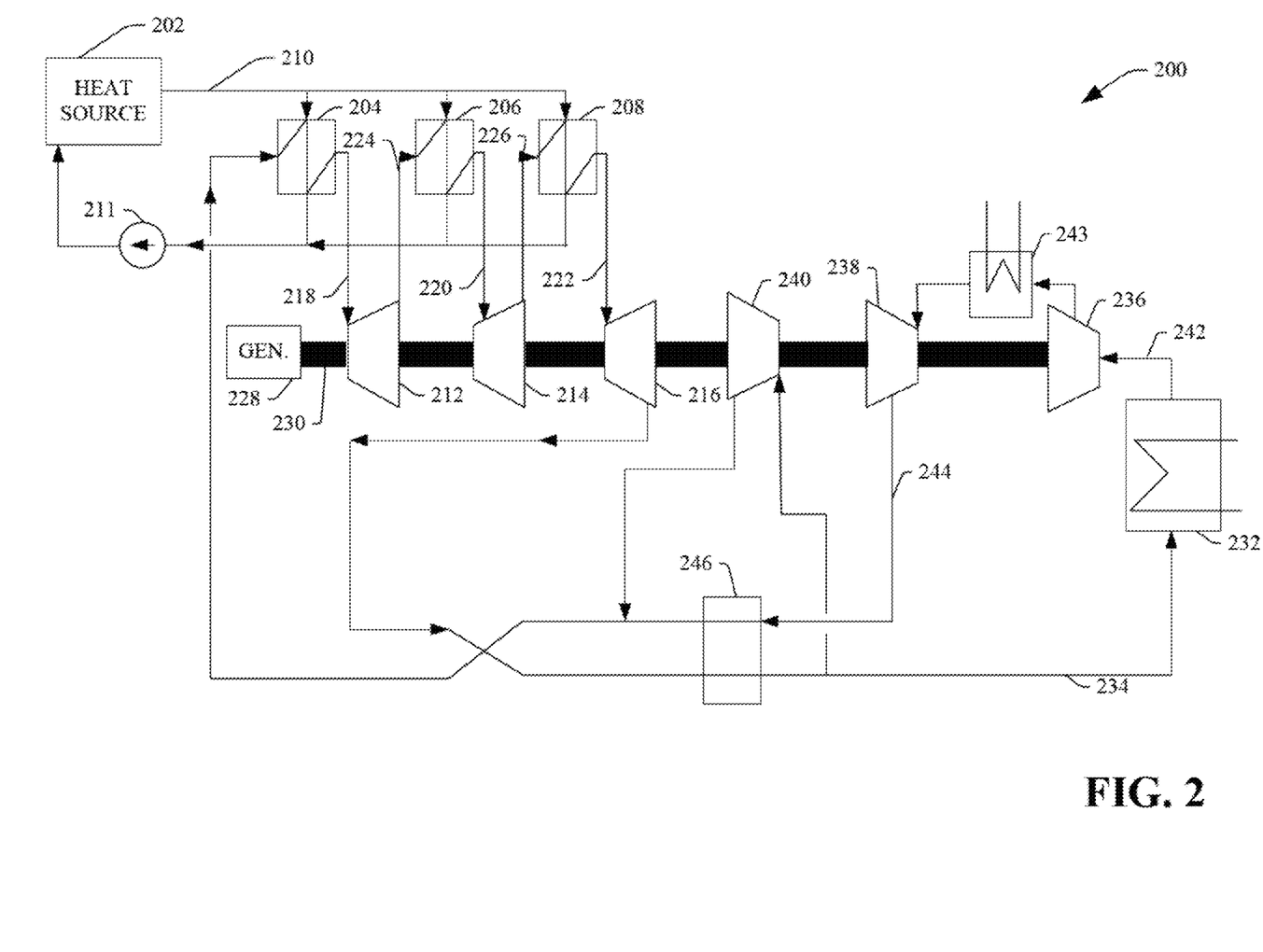
FIG. 2 is a schematic diagram of another exemplary supercritical Brayton cycle power generation system.

With reference now to FIG. 2, a schematic diagram of another exemplary supercritical Brayton cycle power generation system 200 is illustrated. Pursuant to an example, the system 200 can be particularly well-suited for relatively low temperature heat sources including geothermal heat sources. Thus, the system 200 can include a heat source 202, which may be a geothermal heat source. A plurality of heaters 204-208 receives fluid heated by the heat source 202 and further heats the fluid (which may be $CO_2$ with an additive to cause the critical temperature of the fluid to be at a desired critical temperature). The heaters 204-208 receive the fluid from first piping 210. A pump 211 circulates the fluid through the heat source 202 and the heaters 204-208.

The system 200 further includes a plurality of turbines 212-216 that receive fluid exiting the heaters 204-208, respectively, by way of piping 218-222, respectively. Fluid exiting the first turbine 212 is provided to the second heater 206 by way of piping 224, which in turn directs heated fluid to the second turbine 214, the first heater 204, and/or back to the heat source 202. Fluid exiting the second turbine 214 is provided to the third heater 208 by way of piping 226, which directs heated fluid to the third turbine 216, back to the second heater 206, the first heater 204, and/or the heat source 202. The turbines 212-214 are operably connected to a generator 228 by way of a shaft 230, wherein fluid passing through nozzles of the turbines 212-216 causes the turbines 212-216 to rotate, and thus causes the shaft 230 to rotate. The generator 228 creates electric power as a function of rotation of the shaft 230.

The system 200 further comprises a heat rejector 232, which rejects heat near the critical temperature of the fluid. As described above, the critical temperature of the fluid can be tuned by altering composition of the fluid, such that the critical temperature of the fluid is selected to optimize efficiency of the system 200 given an environmental condition (such as ambient temperature). Piping 234 couples the third turbine 216 with the heat rejector 232, such that fluid exiting the third turbine 216 is provided to the heat rejector 232.

The system 200 further comprises a plurality of compressors 236-240, which are operably coupled to the turbines 212-216 and the alternator 228 by way of the shaft 230. The first compressor 236 receives fluid cooled by the heat rejector 232 by way of piping 242, and compresses such fluid. The system 200 optionally includes a second heat rejector 243 (an intercooler) that further cools the fluid that has been compressed by the first compressor 236. The second compressor 238 receives the cooled fluid from the second heat rejector 243, and further compresses such fluid. Compressed fluid output by the second compressor 238 is directed by way of piping 244 to the first heater 204, where it is heated and provided to the first turbine 212 and/or the heat source 202.

The third compressor 240 acts as a recompressor, and compresses fluid that has been output by the third turbine 216. The system 200 optionally includes a low temperature recuperator 246, which acts to transfer heat from the fluid output by the third turbine 216 to the fluid output by the second compressor 238. In other words, the recuperator 246 acts to cool fluid output from the third turbine 216 prior to the fluid being provided to the heat rejector 232 and/or the third compressor 240 (the recompressor).

It is to be understood that the system 200 is an example of a type of supercritical Brayton cycle power generation system that can be employed in connection with aspects described herein, but is not intended to be limiting. Thus, from the above, it can be ascertained that a system with intercooling can be employed, a system with a dry heat rejector can be employed, a multi-turbine system can be employed, a multi-heater system can be employed, etc. For the exemplary system 300, the efficiency can be approximately 18.1% when a 10 mole % mixture of Butane and $CO_2$ is used as the fluid, while the efficiency can be approximately 14.5% when the fluid is pure $CO_2$. This illustrates that improvement in system efficiency can be achieved by using mixtures or additives to $CO_2$ to tailor the fluid to suit at least one environmental condition pertaining to the system 200.

Figure 3:
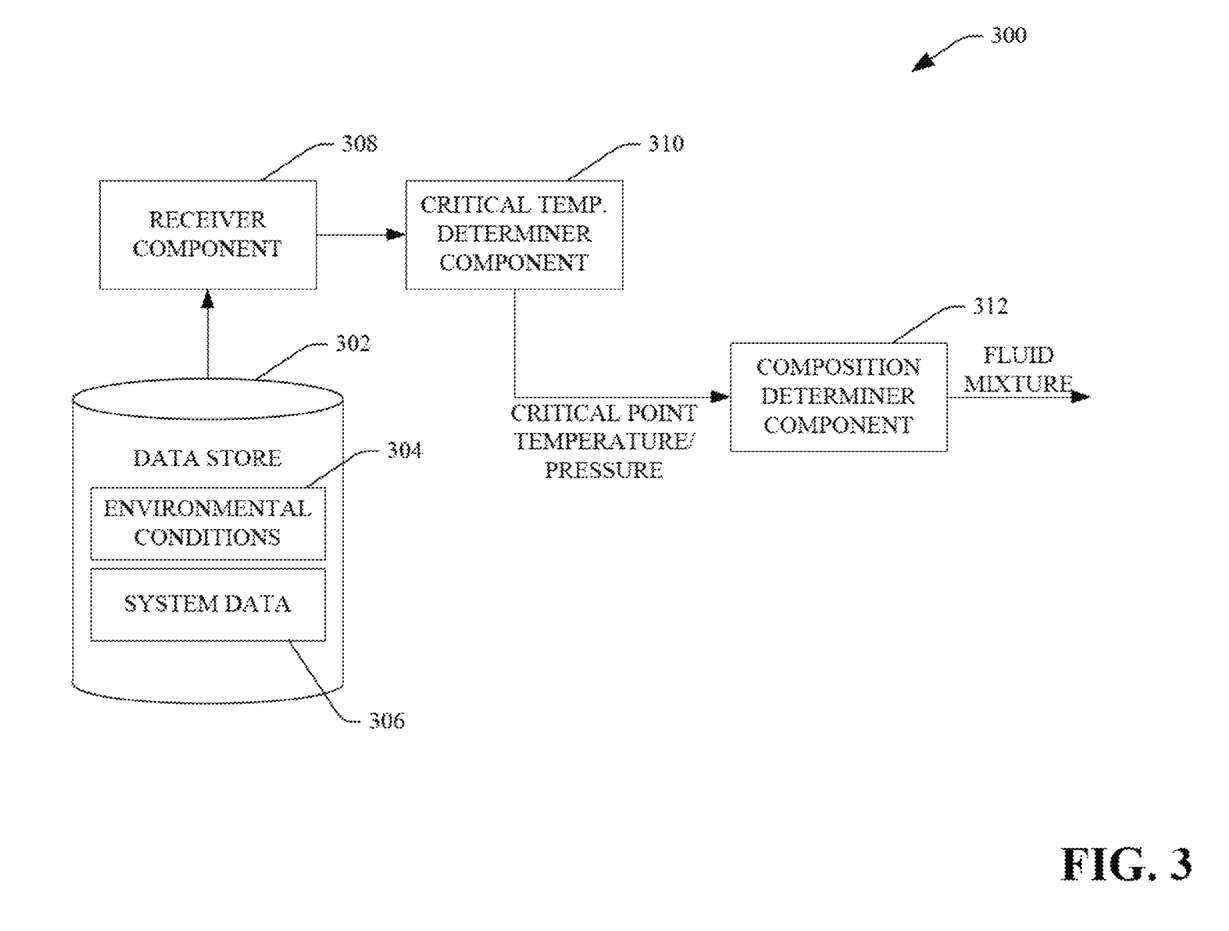
FIG. 3 is a functional block diagram of an exemplary system that facilitates computing a composition of a fluid such that the fluid has a desired critical temperature.

Referring now to FIG. 3, a functional block diagram of an exemplary system 300 that is configured to compute a composition of a fluid to be utilized in a supercritical Brayton cycle power generation system is illustrated. The system 300 may be comprised by any suitable computing apparatus, including but not limited to a desktop computer, a laptop computer, a tablet computer, a mobile telephone, or the like. The system 300 includes a data store 302, which may be a hard drive, memory, flash drive, removable disk, or the like. The data store 302 comprises sensed environmental conditions 304 pertaining to a supercritical Brayton cycle power generation system (such as the systems 100 or 200 described above). The sensed conditions 304 may be historical conditions that can be used to forecast future conditions (e.g., seasonal changes, expected temperature highs and lows, expected humidity) and/or recently obtained conditions that are indicative of current environmental conditions pertaining to the supercritical Brayton cycle power generation system. The data store 302 further comprises system data 306 that includes data pertaining to operation (efficiency) of a supercritical Brayton cycle power generation system obtained through observation and/or simulation. Such data may include operating constraints, types of materials, expected efficiencies for various ambient temperatures, humidity, pressure, and the like.

A receiver component 308 has access to the data store 302 and receives the environmental conditions 304 and the system data 306. The receiver component 308 may be, for instance, a port, an antenna and corresponding circuitry, or the like. A critical temperature determiner component 310 is in communication with the receiver component 308 and computes a desired critical temperature of a fluid that is to be employed in the supercritical Brayton cycle power generation system, wherein the fluid with the critical point enhances cycle efficiency. The critical temperature determiner component 310 computes the desired critical temperature of the fluid based at least in part upon the sensed environmental conditions 304 and the system data 306. In addition to computing the critical temperature, the critical temperature determiner component 310 can also be configured to compute a desired critical pressure of the fluid based at least in part upon the sensed environmental conditions 304 and the system data 306.

A composition determiner component 312 receives the desired critical temperature (and optionally the desired critical pressure) and computes a desired composition of the fluid that has a critical temperature and/or pressure that is near to the desired critical temperature and/or pressure. In this example, the term "near" can mean equivalent, within one degree K, within two degrees K, or within three degrees K. As will be described in greater detail below, the critical temperature determiner component 310 and the composition determiner component 312 can execute as the supercritical Brayton cycle power generation system is in operation, such that the composition of the fluid in such a power generation system can be altered dynamically as environmental conditions change. Thus, for instance, as ambient temperature decreases, the composition of the fluid can be adjusted while the power generation system operates to decrease the critical temperature of such fluid and increase or maintain the efficiency of the power generation system. Likewise, as ambient temperature increases, the composition of the fluid can be adjusted while the power generation system operates to increase the critical temperature of such fluid as heat is rejected at the higher temperature.

Figure 4:
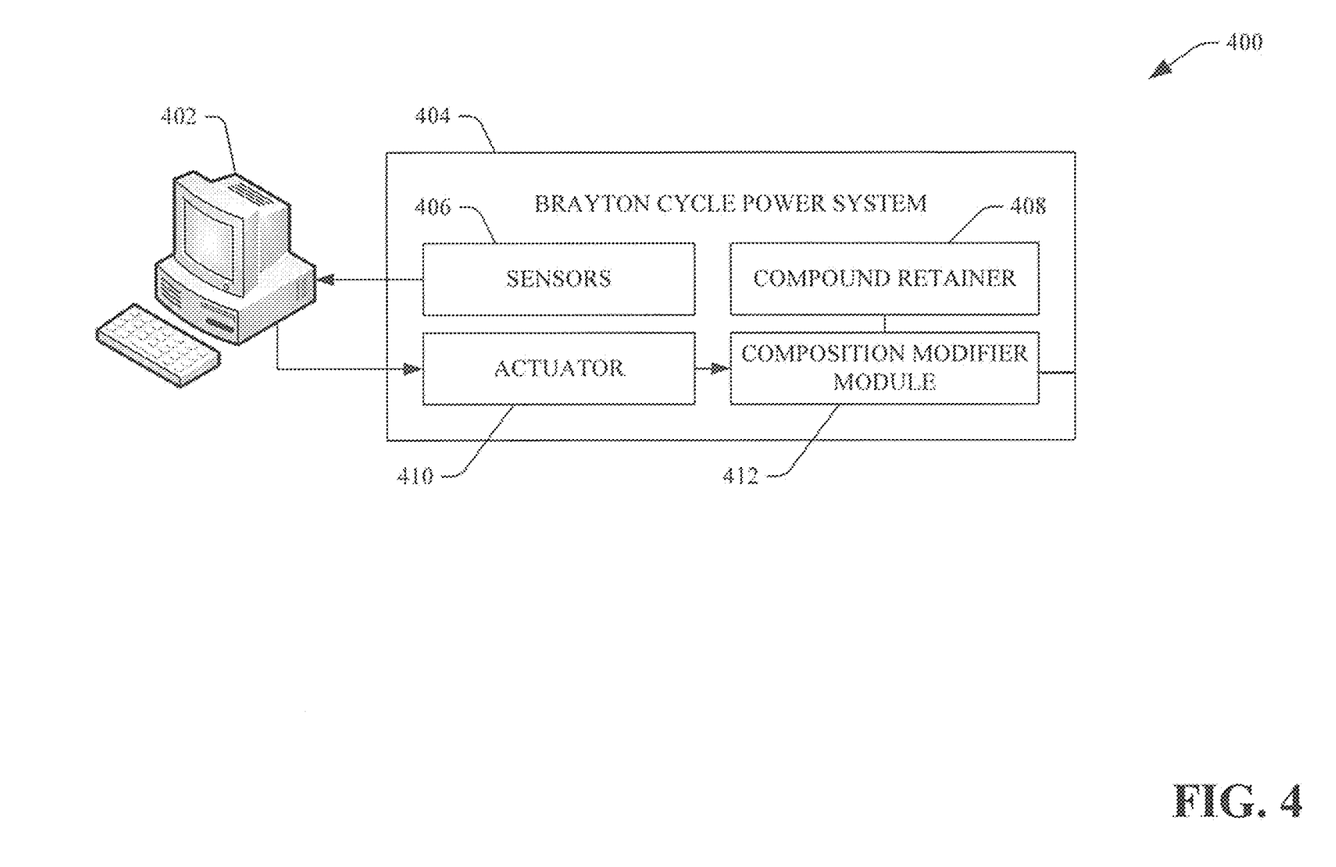
FIG. 4 is a functional block diagram of an exemplary supercritical Brayton cycle power generation system.

With reference now to FIG. 4, a functional block diagram of an exemplary system 400 that facilitates modifying composition of a fluid that is utilized in a supercritical Brayton cycle power generation system is illustrated. The system 400 includes a computing device 402, which may be any suitable computing device. The computing device 400 may, for example, comprise the system 300 described above.

The system 400 further comprises a supercritical Brayton cycle power generation system 404, which may be or include one of the systems 100 or 200 discussed above. The supercritical Brayton cycle power generation system 404 can have sensors 406 associated therewith, wherein at least one sensor in the sensors outputs first data that is indicative of an environmental condition pertaining to the power generation system 404. Therefore, for example, the sensor can output data that is indicative of the ambient temperature corresponding to the power generation system 404, humidity corresponding to the environment of the power generation system 404, barometric pressure corresponding to the environment of the power generation system, and/or other environmental conditions. While the sensors 406 are shown as being included in the power generation system 404, it is to be understood that at least one of the sensors 406 may be located remotely from the power generation system 404. For instance, a sensor may be owned/maintained by a television station, and the computing device 402 can receive first data output by the sensor by way of the Internet.

In another exemplary embodiment, at least one of the sensors 406 can be configured to output data that is indicative of a current composition of the fluid used in the power generation system 404. For instance, the fluid may initially be composed of pure $CO_2$, and over time one or more additives can be added to the fluid. The sensor 406 can monitor an amount of additive that has been added to the fluid and/or extracted from the fluid over time, and can therefore output data that is indicative of the current composition of the fluid.

The computing device 402 receives the first data (the data indicative of the environmental condition) output by the sensor, and based at least in part on such data, computes a desired critical temperature and/or pressure for fluid that is utilized in the power generation system 404. Thereafter, the computing device 402 computes a composition of the fluid that causes the fluid to have the desired critical temperature and/or pressure. Generally, this composition will comprise $CO_2$ and at least non-acidic additive, such as an Alkane and/or $SF_6$. In any event, the composition of the fluid computed by the computing device 402 can enhance efficiency of the power generation system 404. The computing device 402 can then compare the desired composition of the fluid with the current composition of the fluid to ascertain a desired modification to the composition of the fluid in the power generation system 404.

The power generation system 404 can further include a compound retainer 408 that is configured to retain compounds that can be selectively added or removed from the operating fluid of the power generation system 404 during operation of such system 404. An actuator 410 is operably coupled to a composition modifier module 412, wherein the computing device 402 outputs commands to the actuator 410 that cause the actuator 410 to modify operation of the composition modifier module 412, which in turn performs an operation that changes composition of the fluid. For example, the composition modifier module 412 can be or include a condenser that condenses additives in the operating fluid and extracts condensed compounds (e.g., condenses Alkanes) from the fluid. This causes the resulting critical temperature of the fluid to be raised or lowered to the desired critical temperature. In another exemplary embodiment, the composition modifier module 412 may be a valve, such as a drip valve, that is caused by the actuator 410 to increase an amount of additive in the fluid, wherein the additive is operable to raise or lower the critical temperature of the operating fluid to match the desired critical temperature output by the computing device 402.

The computing device 402 is operable to modify the composition of the fluid as environmental conditions change, thereby increasing cycle efficiency corresponding to the power generation system 404. This modification can occur during operation of the power generation system 404, such that the composition of the mixture can change dynamically as environmental conditions change. Thus, one of the sensors 406 can output second data that is indicative of an updated environmental condition, and the computing device 402 can output commands to the actuator 410 that cause the actuator to modify operation of the composition modifier module 412 such that the critical temperature of the fluid is changed to be near a desired critical temperature.

Figure 5:
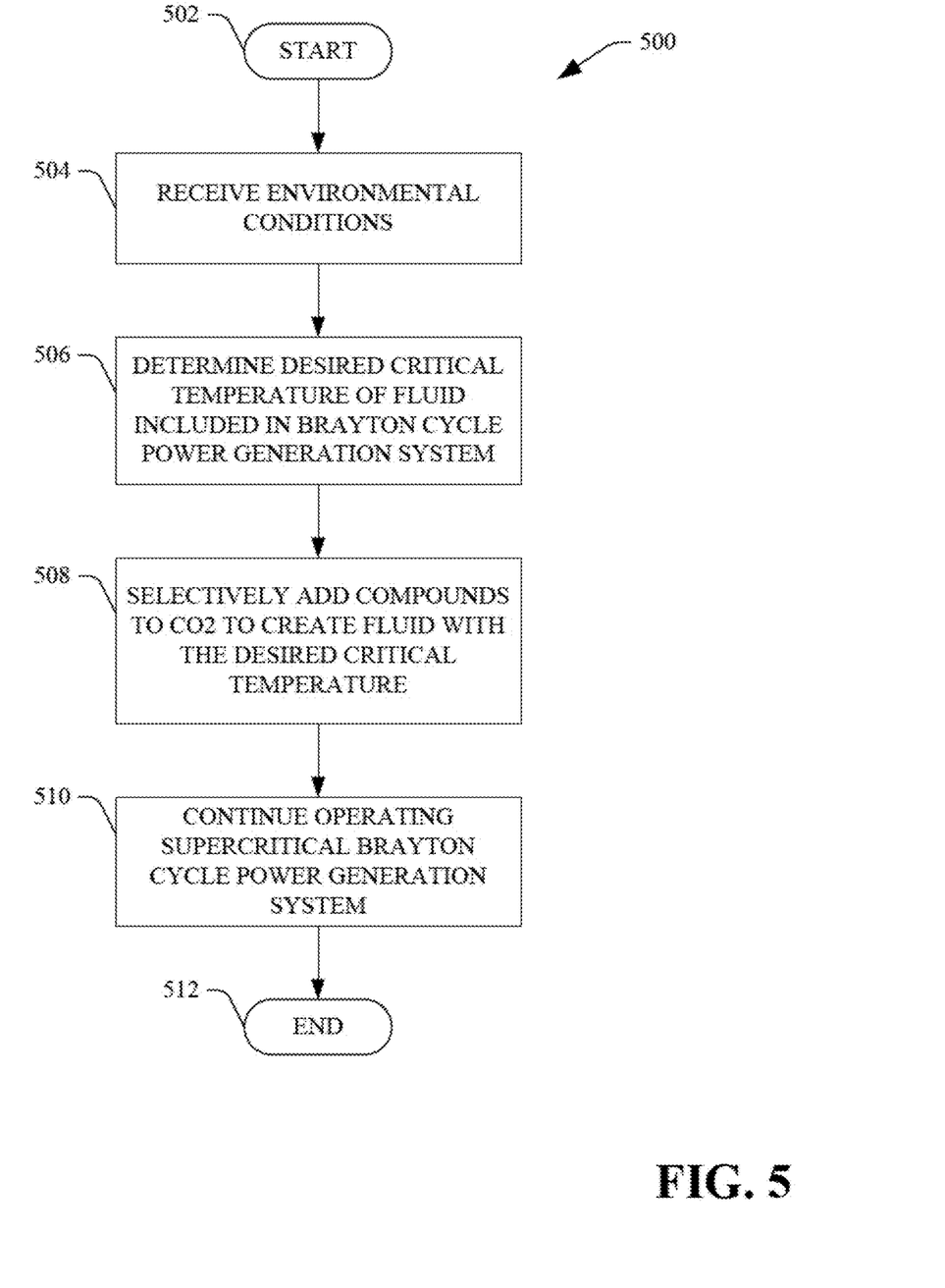
FIG. 5 is a flow diagram that illustrates an exemplary methodology for operating a supercritical Brayton cycle power generation system with a fluid that has a desired critical temperature.

With reference now to FIG. 5, an exemplary methodology is illustrated and described. While the methodology is described as being a series of acts that are performed in a sequence, it is to be understood that the methodology is not limited by the order of the sequence. For instance, some acts may occur in a different order than what is described herein. In addition, an act may occur concurrently with another act. Furthermore, in some instances, not all acts may be required to implement a methodology described herein.

Moreover, one or more of the acts in the methodology may be undertaken through execution of computer-readable instructions by one or more processors, wherein the computer-readable instructions are stored on a computer-readable medium or media. The computer-readable instructions may include a routine, a sub-routine, programs, a thread of execution, and/or the like. Still further, results of acts of the methodology may be stored in a computer-readable medium, displayed on a display device, and/or the like. The computer-readable medium may be a non-transitory medium, such as memory, hard drive, CD, DVD, flash drive, or the like.

Turning now to FIG. 5, an exemplary methodology 500 that facilitates modifying composition of an operating fluid in a supercritical Brayton cycle power generation system is illustrated. The methodology 500 starts at 502, and at 504 environmental conditions pertaining to the supercritical Brayton cycle power generation system are received from a sensor. Additionally, data indicative of a current composition of fluid in the supercritical Brayton cycle power generation system is received. At 506, a desired critical temperature of the operating fluid in the power generation system is computed based at least in part upon the received environmental conditions. At 508, compounds (additives) are selectively added to the operating fluid (which may include $CO_2$) to cause the resulting mixture to have a critical temperature that is near or matches the desired critical temperature. At 510, the supercritical Brayton cycle power generation system is operated using the altered mixture as the operating fluid.

Figure 6:
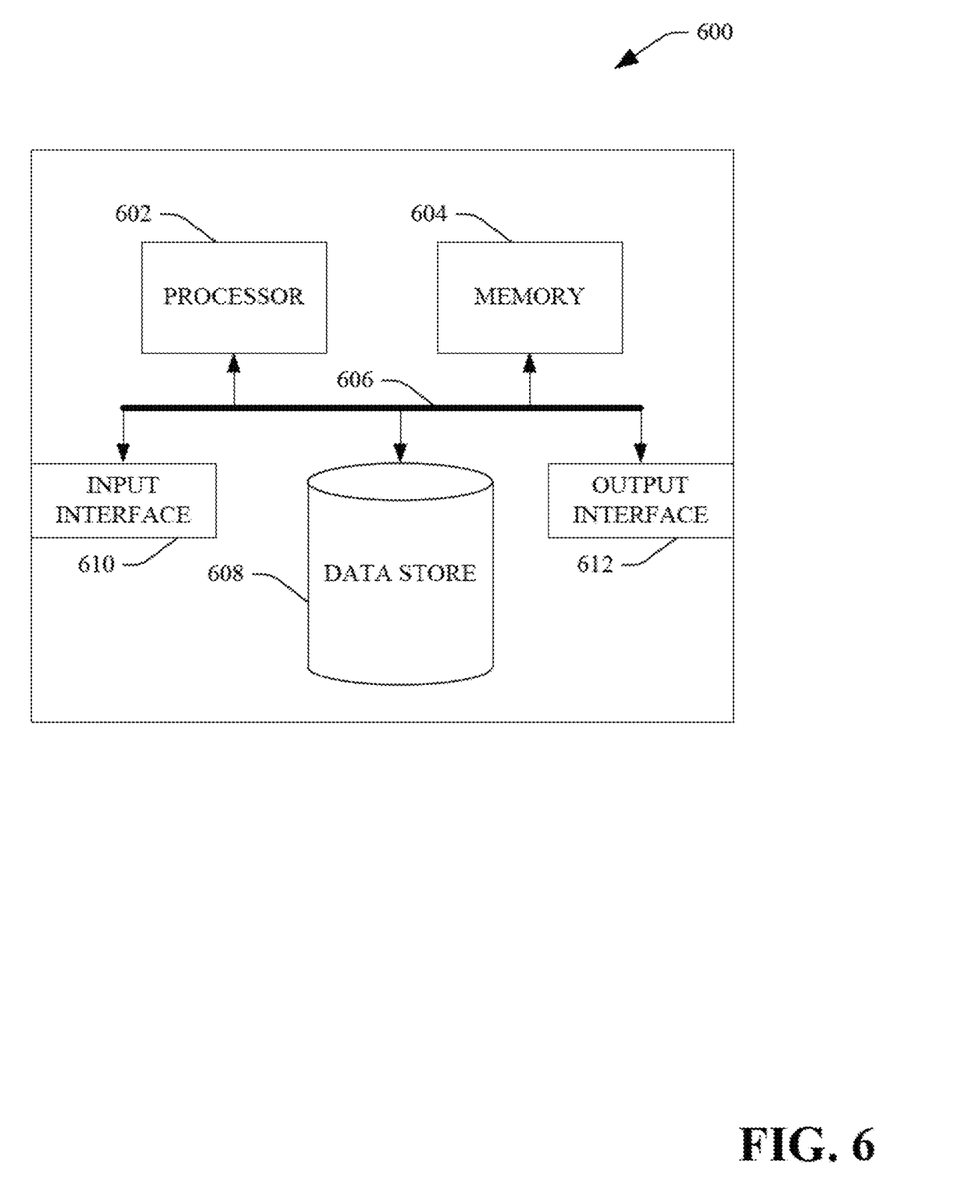
FIG. 6 is an exemplary computing system.

Now referring to FIG. 6, a high-level illustration of an exemplary computing device 600 that can be used in accordance with the systems and methodologies disclosed herein is illustrated. For instance, the computing device 600 may be used in a system that supports computing a desired critical temperature of an operating fluid in a supercritical Brayton cycle power generation system. In another example, at least a portion of the computing device 600 may be used in a system that supports modifying composition of an operating fluid in a supercritical Brayton cycle power generation system during operation of such a power generation system. The computing device 600 includes at least one processor 602 that executes instructions that are stored in a memory 604. The memory 604 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 602 may access the memory 604 by way of a system bus 606. In addition to storing executable instructions, the memory 604 may also store environmental conditions, system data, etc.

The computing device 600 additionally includes a data store 608 that is accessible by the processor 602 by way of the system bus 606. The data store 608 may be or include any suitable computer-readable storage, including a hard disk, memory, etc. The data store 608 may include executable instructions, environmental conditions, system data, etc. The computing device 600 also includes an input interface 610 that allows external devices to communicate with the computing device 600. For instance, the input interface 610 may be used to receive instructions from an external computer device, a user, etc. The computing device 600 also includes an output interface 612 that interfaces the computing device 600 with one or more external devices. For example, the computing device 600 may display text, images, etc. by way of the output interface 612.

Additionally, while illustrated as a single system, it is to be understood that the computing device 600 may be a distributed system. Thus, for instance, several devices may be in communication by way of a network connection and may collectively perform tasks described as being performed by the computing device 600.

It is noted that several example designs of supercritical Brayton cycle power generation systems have been provided for purposes of explanation. It is to be understood that various features across designs can be combined to create a different supercritical Brayton cycle power generation system. Further, the exemplary designs are not to be construed as limiting the hereto-appended claims. Additionally, it may be recognized that some examples provided herein may be permutated while still falling under the scope of the claims.

What is claimed is:

1. A supercritical Brayton cycle power generation system, comprising:
    a heat source that comprises an inlet port and an outlet port, the heat source heating a fluid in the supercritical Brayton cycle power generation system, the fluid being a mixture having a composition that causes the fluid to have a supercritical temperature that is optimized for at least one environmental condition pertaining to the Brayton cycle power generation system;
    a first turbine that comprises an inlet port and an outlet port;
    first piping that operably couples the heat source with the inlet port of the first turbine, the first piping including the fluid;
    a heat exchanger that comprises an inlet port and an outlet port, the heat exchanger rejecting heat near the supercritical temperature of the fluid;
    second piping that operably couples the outlet port of the first turbine with the inlet port of the heat rejector, the second piping including the fluid;
    a compressor having an inlet port and an outlet port;
    third piping that operably couples the outlet port of the heat exchanger with the inlet port of the compressor, the fluid travelling from the heat rejector to the compressor by way of the third piping;
    a generator that generates electric power;
    a rotating shaft that couples the first turbine with the generator, wherein rotation of the shaft causes the generator to generate the electric power;
    fourth piping that operably couples the outlet port of the compressor with the inlet port of the heat source, wherein the fluid travels from the compressor to the heat source by way of the fourth piping;
    a sensor that senses ambient temperature or barometric pressure surrounding the Brayton cycle power generation system;
    an actuator that is caused to dynamically alter the composition of the mixture based at least in part upon the sensed ambient temperature or barometric pressure; and
    wherein the fluid is at supercritical temperature and pressure.

2. The supercritical Brayton cycle power generation system of claim 1, wherein the mixture comprises $CO_2$ and at least one other element or compound.

3. The supercritical Brayton cycle power generation system of claim 2, wherein the at least one other element or compound is an Alkane.

4. The supercritical Brayton cycle power generation system of claim 3, wherein the Alkane is one of Butane, Methane, Propane, or Hexane.

5. The supercritical Brayton cycle power generation system of claim 2, wherein the at least one other element or compound is Helium, Neon, or Nitrogen.

6. The supercritical Brayton cycle power generation system of claim 2, wherein a molar concentration of the at least one other element or compound in the mixture is less than 10 percent.

7. The supercritical Brayton cycle power generation system of claim 6, wherein the molar concentration of the at least one other element or compound in the mixture is less than 5 percent.

8. The supercritical Brayton cycle power generation system of claim 1, further comprising a composition modifier module that is controlled by the actuator to cause the composition of the mixture to be dynamically altered based at least in part upon the at least one environmental condition.

9. The supercritical Brayton cycle power generation system of claim 8, wherein the composition modifier module condenses an element or compound in the mixture for extraction from the mixture.

10. The supercritical Brayton cycle power generation system of claim 1, wherein the sensor senses ambient temperature.

11. The supercritical Brayton cycle power generation system of claim 1, wherein the sensor senses barometric pressure.

12. The supercritical Brayton cycle power generation system of claim 1, further comprising:
    a recompressor comprising an inlet port and an outlet port;
    fifth piping that couples the inlet port of the recompressor with the second piping such that the fluid travels from the first turbine to the recompressor by way of the second piping and the fifth piping; and
    sixth piping that couples the outlet port of the recompressor with the fourth piping such that the fluid travels from the recompressor to the first turbine by way of the sixth piping and the fourth piping.

13. The supercritical Brayton cycle power generation system of claim 1 being an intercooled power generation system.

14. The supercritical Brayton cycle power generation system of claim 1, wherein the heat source is a geothermal heat source.

15. A method, comprising:
    sensing at least one environmental condition pertaining to a supercritical Brayton cycle power generation system by a sensor;
    receiving in a processor first data from the sensor that senses the at least one environmental condition;

computing a first desired critical temperature of a fluid that flows through the supercritical Brayton cycle power generation system based at least in part upon the first data from the sensor;

causing the processor to compute a first composition of the fluid such that the fluid has the first desired critical temperature and adjusting at least one parameter of the fluid by an actuator that effects a composition modifier module to add or remove compounds or additives to the fluid to obtain the first composition; and operating the Brayton cycle power generation system with the fluid of the first composition computed by the processor;

wherein the at least one environmental condition is selected from the group consisting of ambient temperature and barometric pressure; and wherein the fluid is at supercritical temperature and pressure.

16. The method of claim 15, wherein the composition of the fluid comprises at least 90% $CO_2$ by molar concentration.

17. The method of claim 16, wherein the composition of the fluid additionally comprises an Alkane.

18. The method of claim 15, further comprising:

receiving second data from the sensor that senses at least one environmental condition pertaining to the supercritical Brayton cycle power generation system;

computing a second desired critical temperature of the fluid based at least in part upon the second data from the sensor;

causing the processor to compute a second composition of the fluid such that the fluid has the second desired critical temperature;

dynamically changing concentration of a compound or element in the fluid by adjusting at least one parameter of the fluid by adding compounds or additives to the fluid to obtain the first composition to cause a composition of the fluid to change from the first composition to the second composition as the supercritical Brayton cycle power generation system is generating electric power.

19. A supercritical Brayton cycle power generation system, comprising:

compressor means for compressing a fluid having a composition that travels through the supercritical Brayton cycle power generation system;

turbine means that receives the fluid compressed by the compressor means and rotates a shaft;

generator means that is coupled to the shaft and generates electric power based at least in part upon rotational velocity of the shaft;

piping means for transporting the fluid between the turbine means and the compressor means; and heat rejection means for rejecting heat in the piping means at a temperature that is within 10% of the desired supercritical temperature of the fluid;

wherein the environmental parameter is selected from a group consisting of ambient temperature and barometric pressure; and wherein the fluid is at supercritical temperature and pressure;

an actuator to add or remove compounds or additives to the fluid;

a processor that sends a signal to the actuator to add or remove compounds or additives to the fluid to modify the composition of the fluid during operation based at least in part upon a desired supercritical temperature of the fluid, a sensor for sensing ambient temperature or barometric pressure;

wherein the system modifies the composition to obtain the desired supercritical temperature of the fluid based at least in part upon an environmental parameter sensed by the sensor, the composition comprising $CO_2$ and an alkane.

* * * * *